(12) United States Patent
Jendbro et al.

(10) Patent No.: US 6,885,337 B2
(45) Date of Patent: Apr. 26, 2005

(54) METHODS AND APPARATUS FOR DETERMINING THE POSITION OF A MOBILE TERMINAL USING LOCALIZED SOURCE ASSISTANCE INFORMATION

(75) Inventors: Magnus Jendbro, Lund (SE); Björn Hansson, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/661,456

(22) Filed: Sep. 10, 2003

(65) Prior Publication Data

US 2005/0052318 A1 Mar. 10, 2005

(51) Int. Cl.$^7$ .............................................. H04B 7/185
(52) U.S. Cl. ............................ 342/357.1; 342/357.06; 701/213
(58) Field of Search ..................... 342/357.01, 357.06, 342/357.09, 457, 463; 701/213, 207

(56) References Cited

U.S. PATENT DOCUMENTS

| | | | | |
|---|---|---|---|---|
| 4,445,118 | A | | 4/1984 | Taylor et al. .............. 343/357 |
| 5,418,538 | A | | 5/1995 | Lau ............................ 342/357 |
| 5,663,734 | A | | 9/1997 | Krasner ...................... 342/357 |
| 5,663,735 | A | | 9/1997 | Eshenbach .................. 342/357 |
| 6,625,458 | B1 | * | 9/2003 | Pihl et al. ................ 455/456.1 |
| 2002/0168988 | A1 | * | 11/2002 | Younis ........................ 455/456 |
| 2003/0011511 | A1 | * | 1/2003 | King et al. .............. 342/357.02 |
| 2003/0129993 | A1 | * | 7/2003 | Overy et al. ................ 455/456 |
| 2003/0151547 | A1 | * | 8/2003 | Mauro et al. .......... 342/357.15 |
| 2003/0214961 | A1 | * | 11/2003 | Nevo et al. .................. 370/401 |

OTHER PUBLICATIONS

S. Rathi; "Blue Tooth Protocol Architecture", Dedicated Systems Magazine 00q4 on Embedded Internet–2000 http://www.dedicated–systems.com/magazine/00q4/rtm004big.html.

* cited by examiner

Primary Examiner—Dao Phan
(74) Attorney, Agent, or Firm—Myers Bigel Sibley & Sajovec

(57) ABSTRACT

The position of a mobile terminal is determined including receiving location determination signals from satellite positioning system transmitters. Location assistance information is received from a wide area wireless communication network in an associated format defined by a protocol of the network. Location assistance information is received from a local wireless transmitter in the associated format. The local wireless transmitter and the wide area wireless communication network are uncoordinated and have different associated wireless transmission protocols. The position of the mobile terminal is determined based on the received signals from the satellite positioning system transmitters and location assistance information received from either the wide area wireless communication network or the local wireless transmitter. The source of the location assistance information may be selected based on availability and may be an ad hoc protocol wireless transmitter, such as a Bluetooth transmitter.

35 Claims, 7 Drawing Sheets

METHODS AND APPARATUS FOR DETERMINING THE POSITION OF A MOBILE TERMINAL USING LOCALIZED SOURCE ASSISTANCE INFORMATION

BACKGROUND OF THE INVENTION

The present invention relates to the field of communications in general and more particularly, to determining the position of a mobile terminal device.

Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

In addition to such regulated wide area cellular networks, localized short range transmission protocols and wireless local area networks (WLAN) are also known. For example, the wireless coupling between the handheld electronic device and the video signal generator can be provided, for example, using the Bluetooth protocol for short range transmission (typically up to a maximum distance of 100 meters). The Bluetooth protocol is discussed, for example, by Sailesh Rathi in the reference entitled "Blue Tooth Protocol Architecture" from Dedicated Systems Magazine, 2000 Q4, pages 28–33, the disclosure of which is hereby incorporated herein in its entirety by reference. Wireless local area networks providing access points to the Internet are becoming more common at work places, coffee shops and the like.

It is desirable, and in certain places mandated by law, that mobile telecommunication network providers be able to determine an approximate geographical location of a mobile terminal (MT), such as, for example, an actively communicating cellular telephone.

A variety of MT location techniques have been proposed. These location techniques include uplink signal location, downlink signal location, Global Positioning System (GPS) based approaches, assisted GPS approaches combining communication signals and GPS signals and approaches based on digital television signals. For "uplink signal" location techniques, the mobile telecommunications network is typically configured to determine where the MT is located based on ranging measurements associated with one or more uplink signals. These uplink signals are transmitted by the MT and received by a number of receivers having known locations, such as, for example, cellular telephone base stations (BSs). For the "downlink signal" location techniques, the mobile telecommunications network is typically configured to determine where the MT is located based on ranging measurements associated with the reception, by the MT, of downlink signals from a number of transmitters having known locations.

FIG. 1 illustrates a conventional terrestrial wide area mobile (wireless) communications network 20 that may implement any one of a variety of known wireless communications standards including uplink and downlink signals. The wireless network may include one or more wireless mobile terminals 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile stations 22.

The cells 24 generally serve as nodes in the network 20, from which links are established between wireless mobile terminals 22 and a MTSO 28, by way of the base stations 26 servicing the cells 24. Each cell 24 will have allocated to it one or more dedicated control channels and one or more traffic channels. The control channel is a dedicated channel that may be used for downlink transmission (network to mobile) of cell identification and paging information. The traffic channels carry the voice and data information. Through the network 20, a duplex (downlink and uplink) radio communication link 30 may be effected between two wireless mobile stations 22 or between a wireless mobile station 22 and a landline telephone user 32 via a public switched telephone network (PSTN) 34. The function of the base station 26 is commonly to handle the radio communications between the cell 24 and the wireless mobile station 22. In this capacity, the base station 26 functions chiefly as a relay station for data and voice signals. It is also know to provide wide area wireless communications networks in which the functions provided by the base stations are provided by satellites, having associated coverage areas, rather than terrestrial base stations.

The GPS location approach generally uses location services not associated with either the uplink or downlink signals used in the mobile telecommunications network. In a typically GPS application, the GPS receivers collect and analyze ranging measurements from signals transmitted by GPS satellites having known locations.

As illustrated in FIG. 2, GPS is a space-based triangulation system using satellites 42 and GPS control computers 48 to measure positions anywhere on the earth. GPS was first developed by the United States Department of Defense as a navigational system. The advantages of this navigational system over land-based systems are that it is not limited in its coverage, it provides continuous 24-hour coverage, which may be highly accurate regardless of weather conditions. In operation, a constellation of 24 satellites 42 orbiting the earth continually emit a GPS radio signal 44. A GPS receiver 46, e.g., a hand-held radio receiver with a GPS processor, receives the radio signals from the visible satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 46 through a process of triangulation. It is known to include a GPS receiver 46 in a mobile station 22 to provide position location functionality to the mobile station 22.

The startup of a GPS receiver typically requires the acquisition of a set of navigational parameters from the navigational data signals of four or more GPS satellites. This process of initializing a GPS receiver may often take several minutes. The duration of the GPS positioning process is directly dependent upon how much information a GPS receiver has initially. Some GPS receivers are programmed with almanac data, which coarsely describes the expected satellite positions for up to one year ahead. However, if the GPS receiver does not have some knowledge of its own approximate location, then the GPS receiver may not be able to find or acquire signals from the visible satellites quickly enough, and, therefore, cannot calculate its position quickly. Furthermore, it should be noted that a higher signal strength is typically needed for capturing the navigation data at start-up than is needed for continued monitoring of an already-acquired signal. It should also be noted that the process of monitoring the GPS signal may be significantly affected by environmental factors. Thus, a GPS signal which may be easily acquired in the open typically becomes harder to acquire when a receiver is under foliage, in a vehicle or in a building.

It is known to provide mobile terminals with accurate location assistance information, e.g., local time and position estimates, satellite ephemeris and clock information, and visible satellite list (which generally varies with the location of the mobile station). The use of such assistance data can permit a GPS receiver that is integrated with or connected to a mobile terminal to expedite the completion of its start-up procedures.

Taylor et al., U.S. Pat. No. 4,445,118, discusses the concept of aiding or assisting GPS receivers. The method described uses a single transmitter, such as a geosynchronous satellite, to provide a single assistance message for a wide geographical area. The assistance message data includes a list of GPS satellites in view, the respective satellite positions, and predicted Doppler shifts on the satellite signals. This structure of this message permits the position computation function (PCF) to be done in the user receiver.

Krasner, U.S. Pat. No. 5,663,734, describes another GPS receiver approach. This patent is mainly related to the receiver architecture, but discusses how the receiver performance can be improved by assistance. The patent mentions "data representative of ephemeris" and expected Doppler shifts as possible contents of the assistance message.

Lau, U.S. Pat. No. 5,418,538, describes a system and method for aiding a remote GPS/GLONASS receiver by broadcasting "differential" information from a like receiver in a "reference station." The reference station broadcasts a visible satellite list and also the associated ephemeris, in one embodiment. The advantages to the remote receiver may be three-fold: reduced memory requirements, lower-cost frequency reference, and faster acquisition. The discussion describes the benefit of being able to estimate and remove the Doppler shift due to the receiver clock inaccuracy after acquiring the first satellite.

Eshenbach, U.S. Pat. No. 5,663,735, describes a method whereby a GPS receiver derives an accurate absolute time reference from a radio signal. Optionally, the receiver also derives from the radio signal a frequency reference that is more accurate than the inexpensive crystal oscillator contained in the receiver. The GPS receiver performs the position calculation, and therefore must have the absolute time as well as the ephemeris and clock corrections for the GPS satellites.

Another assisted-GPS standard for wide area wireless networks, in particular GSM-based networks, is described in specification numbers 3GPP TS 04.31, 04.35 and 3GPP TS 03.71. This standard is based on placing reference GPS receivers at various nodes in the network, capturing the ephemeris information from these receivers, then providing this information along with a list of visible satellites and/or other information to all handset-based GPS receivers via messages on GSM downlink bearers. The benefit of this approach is that it allows the handset-based GPS receiver to be fully functional, i.e., it contains the position computation function and also can operate in continuous navigation mode. However, to obtain such data from the GSM-based network, the GSM network provider must make the data available. Furthermore, it is expected that the providers may require a subscription or other relationship with a mobile terminal requesting the information before it is provided. Even if a user of a mobile terminal has a subscription with a local provider, that subscription may not entitle the user to access the assistance data in other networks when traveling.

SUMMARY OF THE INVENTION

Embodiments of the present invention include methods, apparatus and circuits for determining the position of a mobile terminal. The position of the mobile terminal is determined based on signals received at the mobile terminal from satellite positioning system transmitters and location assistance information received at the mobile terminal from an ad hoc protocol wireless transmitter. The ad hoc protocol wireless network transmitter may be, for example, a Bluetooth protocol transmitter. The satellite positioning system transmitters may be, for example, Global Positioning System (GPS) satellites.

In some embodiments of the present invention, determining the position includes transmitting a service discovery request configured for receipt by the ad hoc protocol wireless network transmitter. A response to the service discovery request is received from the ad hoc protocol wireless network transmitter indicating availability of the location assistance information from the ad hoc protocol wireless network transmitter. The location assistance information is received from the ad hoc protocol wireless transmitter.

In other embodiments of the present invention, the mobile terminal is configured to communicate with a wide area wireless communication network configured to provide wireless communication services based on an associated communication protocol that supports provision of location assistance information to the mobile terminal. In such embodiments, the method further includes determining availability of the wireless communication network to the mobile terminal and obtaining the location assistance information from the wireless communication network. Location assistance information received from the ad hoc protocol wireless network and location assistance information received from the wireless communication network may share a common format for use in determining the position of the mobile terminal. The wireless communication network may be, for example, a Global System for Mobile communications (GSM) network and the common format may then be based on a radio resource location services protocol (RRLP). The method may further include selecting the ad hoc protocol wireless transmitter or the wireless communication network to provide the location assistance information. The location assistance information in some embodiments of the present invention includes identification of locally visible satellites.

In further embodiments of the present invention, determining the position of the mobile terminal further includes the ad hoc protocol wireless transmitter receiving the service discovery request, obtaining the location assistance information and transmitting the obtained location service information to the mobile terminal. The location assistance information may be obtained from a location server having a satellite positioning system receiver. In other embodiments, the ad hoc protocol wireless transmitter includes a satellite positioning system receiver and the location assistance information is obtained from a storage device of the ad hoc protocol wireless transmitter based on signals received by the satellite positioning system receiver.

In other embodiments of the present invention, an ad hoc protocol wireless transmitter provides location assistance information to a mobile terminal. The ad hoc protocol wireless transmitter receives from the mobile terminal a service discovery request configured for receipt by the ad hoc protocol wireless transmitter to determine availability of location assistance information, transmits a response to the service discovery request indicating availability of the location assistance information from the ad hoc protocol wireless network transmitter and transmits the location assistance information to the mobile terminal.

In further embodiments of the present invention, methods are provided for determining the position of a mobile terminal including the mobile terminal receiving location signals from satellite positioning system transmitters. The mobile terminal further receives location assistance information from a wide area wireless communication network in an associated format defined by a protocol of the network and receives location assistance information from a local wireless transmitter in the associated format. The local wireless transmitter and the wide area wireless communication network are uncoordinated and have different associated wireless transmission protocols. The mobile terminal determines the position of the mobile terminal based on the received location signals from the satellite positioning system transmitters and location assistance information received from either the wide area wireless communication network or the local wireless transmitter.

In some embodiments of the present invention, the local wireless transmitter is a wireless local area network. The location assistance information may be obtained over the wireless local area network from a location server having a satellite positioning system receiver. Obtaining the location assistance information over the wireless local area network from a location server having a satellite positioning system receiver may include providing a universal resource locator (URL) of the location server from the mobile terminal to the wireless local area network. The wireless local area network may be, for example, an 802.11 series protocol network.

In other embodiments of the present invention, position determination circuits for a mobile terminal are provided including a satellite positioning system signal processing circuit configured to process location signals from satellite positioning system transmitters and a wireless transceiver configured to communicate with an ad hoc protocol wireless transmitter to request and receive location assistance information. The position determination circuit further includes a position computation circuit configured to determine a position of the mobile terminal based on signals from the satellite positioning system signal processing circuit and the location assistance information from the ad hoc protocol wireless transmitter provided by the wireless transceiver. The wireless transceiver may be configured to transmit a service discovery request to the ad hoc protocol wireless transmitter to determine if location assistance information is available from the ad hoc protocol wireless transmitter.

In further embodiments of the present invention, position determination circuits for a mobile terminal are provided including a satellite positioning system signal processing circuit configured to process location signals from satellite positioning system transmitters and a wireless transceiver configured to communicate with a wide area wireless communication network in an associated format defined by a protocol of the network to request and receive location assistance information. The position determination circuits further include a wireless transceiver configured to communicate with a local wireless transmitter in the associated format to request and receive location assistance information. The local wireless transmitter and the wide area wireless communication network are uncoordinated and have different associated wireless transmission protocols. The position determination circuit also includes a position computation circuit configured to determine the position of the mobile terminal based on the location signals from the satellite positioning system transmitters and location assistance information received from either the wide area wireless communication network or the local wireless transmitter.

In other embodiments of the present invention, location assistance information provider apparatus are provided including an ad hoc protocol wireless receiver configured to receive service discovery requests from mobile terminals to determine availability of location assistance information and an ad hoc protocol wireless transmitter configured to transmit a response to a received service discovery request indicating availability of the location assistance information from the location assistance information provider and to transmit location assistance information to requesting mobile terminals. The apparatus further includes a location assistance information access circuit configured to obtain the location assistance information and provide obtained location assistance information to the ad hoc protocol wireless transmitter.

Corresponding mobile terminals including position determination circuits are also provided.

DETAILED DESCRIPTION

Figure 1:
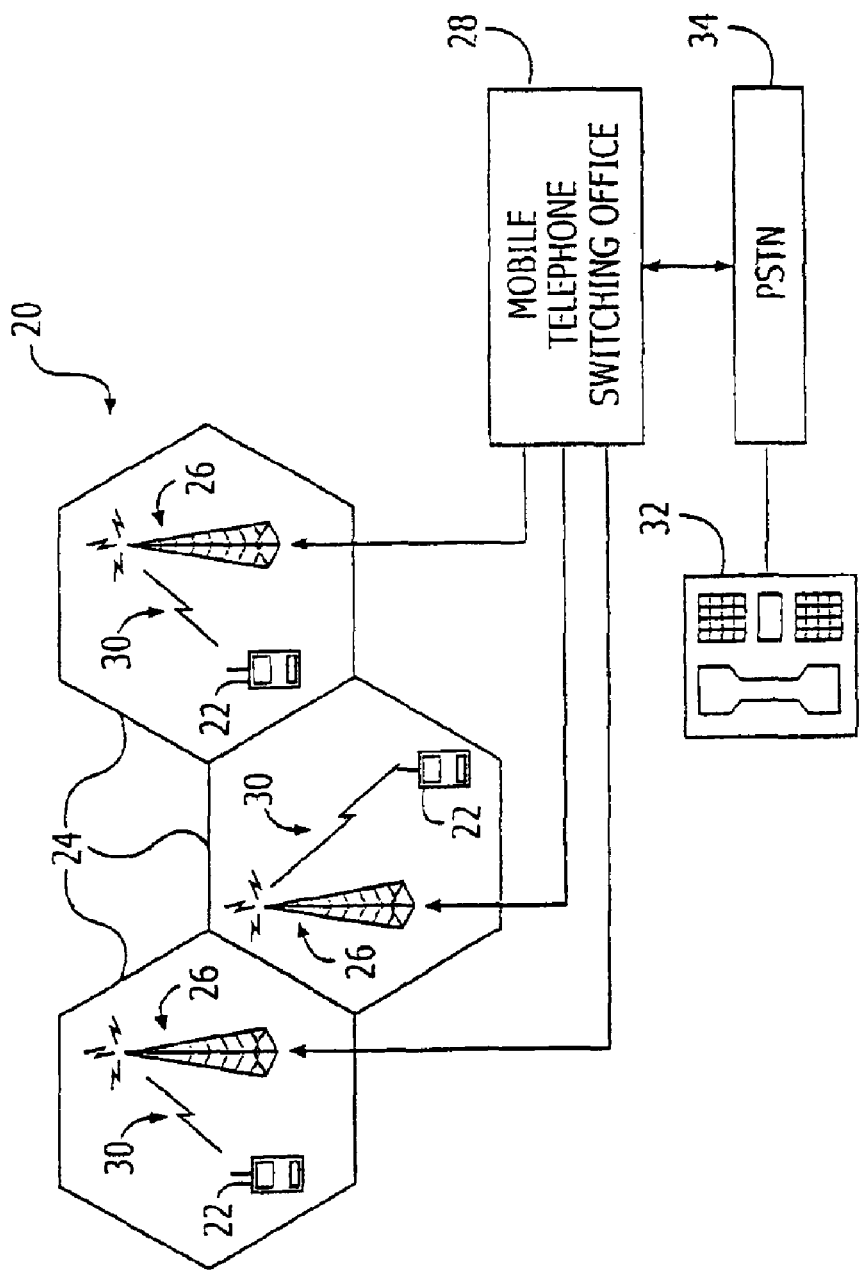
FIG. 1 is a schematic block diagram illustrating a conventional terrestrial wireless communication system.
Figure 2:
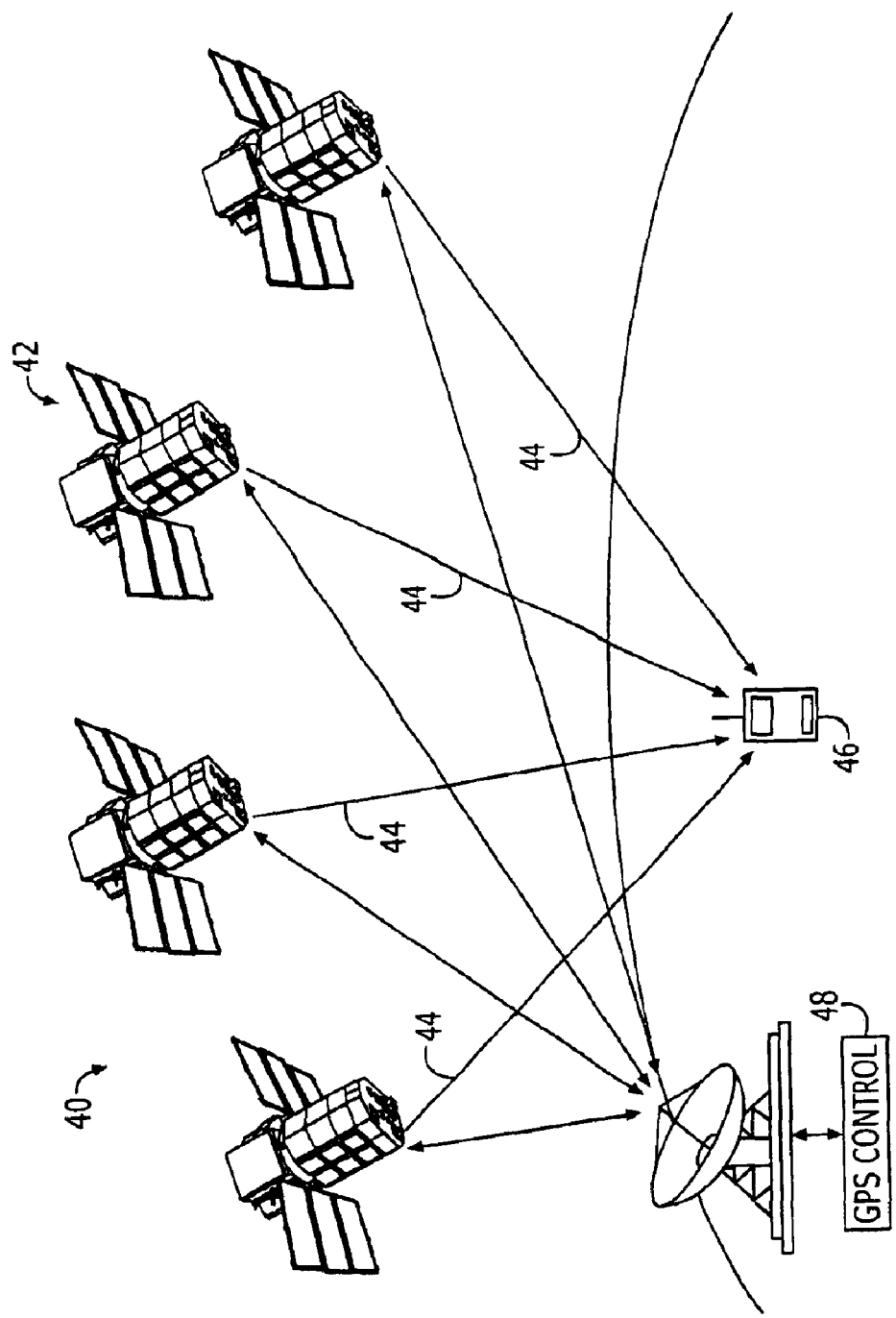
FIG. 2 is schematic block diagram illustrating a GPS system.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, circuit or mobile terminal. Accordingly, the present invention may take the form of an entirely hardware embodiment, an entirely software embodiment or an embodiment combining software and hardware aspects, all generally referred to herein as a "circuit."

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

In accordance with certain embodiments of the present invention, a mobile terminal (MT), such as, for example, an actively communicating cellular telephone, is located using location assistance information provided by a localized ad hoc protocol source of wireless signals, such as a Bluetooth transmitter. In some embodiments of the present invention, a MT is located using either location assistance information from a wide area wireless communication network or a local transmitter where the location assistance information is provided in the same format even though the local transmitter uses a different communication protocol than the wireless communication network.

By way of background, each of the known location determination techniques described generally above have certain characteristics in common. For example, each of these systems uses the collection of a requisite number of ranging measurements from signals passed between transmitter(s) and receiver(s), wherein either the transmitter(s) or the receiver(s) have known or determinable locations (i.e., positions). Further, each of the collected ranging measurements can generally be converted from a time interval measurement to a corresponding distance measurement, for example, by multiplying by the speed of light or an expected speed of transmission associated with the signal. Once the conversion from time to distance has been accomplished, then traditional triangulation, or other like mathematical techniques can be used to determine the positional coordinates of the MT, based on the known locations and calculated distances.

In the case of the GPS location technique, as discussed above, the positions of the GPS satellites vary with time. Thus, a GPS receiver generally needs to receive an accurate measurement of time from the GPS satellites (or an accurate GPS-related source on the ground) in order to know the positions of the GPS satellites at the time of the ranging measurements. The ranging measurements between the GPS receiver and each of at least four (4) GPS satellites occurs by: 1) finding the starting point on the 1023 chip long Gold code sequence within the signal transmitted by each GPS satellite; 2) finding the start time of a bit edge; and 3) finding the start time of the data message. The resulting "time of flight" for the signal received from each GPS satellite is then converted to distance. The resulting four (4) range measurements allow for a solution to the GPS receiver's position in x, y and z coordinates and for determination of the unknown time difference between the GPS time and the GPS receiver's independent clock. Further discussion of mathematical solutions suitable for use with the position estimation operations of embodiments of the present invention are provided in U.S. Pat. No. 6,252,543, which is incorporated herein by reference as if set forth in its entirety.

Figure 3:
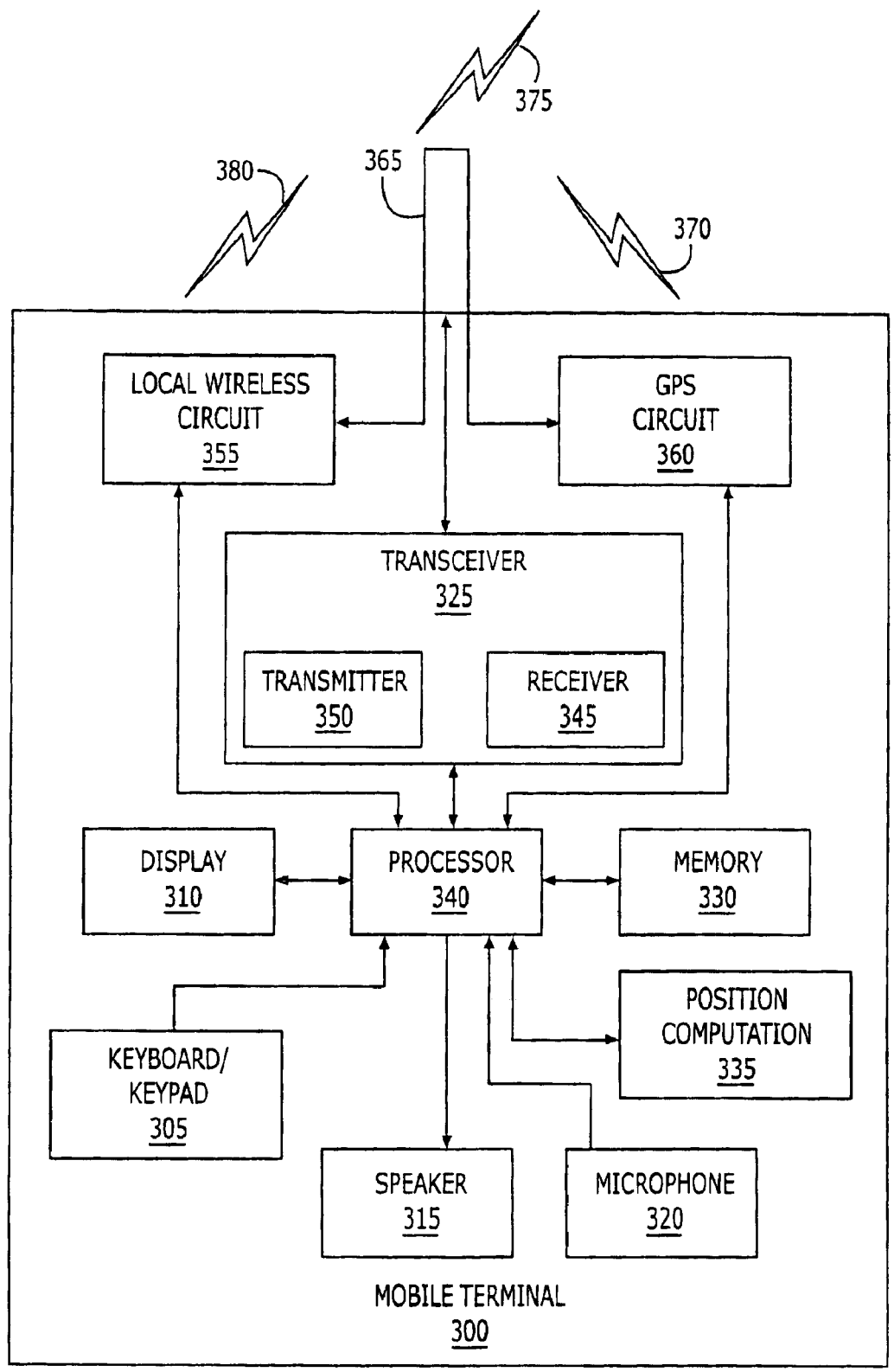
FIG. 3 is a schematic block diagram illustrating a mobile terminal including a position determination circuit according to some embodiments of the present invention.

Embodiments of the present invention will now be further described with reference to the schematic block diagram illustration of a mobile terminal 300 including a position determination circuit in FIG. 3. FIG. 3 illustrates a mobile wireless terminal 300, a signal 380 from a local wireless transmitter, a GPS signal 370 and a wide area wireless communication network (base station downlink/uplink) signal 375. The mobile terminal 300 may include a keyboard/keypad 305, a display 310, a speaker 315, a microphone 320, a network transceiver 325, and a memory 330 that communicate with a processor 340. The network transceiver 325 typically comprises a transmitter circuit 350 and a receiver circuit 345, which respectively transmit outgoing radio frequency signals to a base station of the wireless network and receive incoming radio frequency signals from the wireless network, such as voice communications, text messaging, email and the like, via an antenna 365. While a single antenna 365 is shown in FIG. 3, it is to be understood that multiple antennas and/or different types of antennas may be utilized based on the types of signals being received. The radio frequency signals transmitted between the mobile terminal 300 and the wireless network may include both traffic and control signals (e.g., paging signals/messages for incoming calls), which are used to establish and maintain communication with another party or destination, and may provide uplink and/or downlink communications. However, the present invention is not limited to such two-way communication systems.

The foregoing components of the mobile terminal 300 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to herein as "wireless terminals."

Also shown in the mobile terminal 300 of FIG. 3 is a local wireless transceiver circuit 355 and a satellite positioning system signal processing circuit, in particular, a GPS receiver circuit 360. The local wireless transceiver circuit 355, in cooperation with the processor 340, communicates with a local wireless transmitter, when available, to request availability of and to obtain location assistance information. In particular, the operations of the local wireless transceiver circuit 355 and the transceiver 325 support different associated wireless communication protocols for the wide area wireless communication network and the local wireless transmitter, which is uncoordinated with the wide area cellular network. For example, in some embodiments of the present invention, the local wireless transceiver circuit 355 is configured to support communications with an ad hoc protocol transmitter, such as a Bluetooth protocol transmitter. As used herein, an "ad hoc" protocol network or transmitter refers to one that is generally configured at the time of use based on the resources available. Such networks, typically, provide a service discovery protocol to allow, for example, identification of available resources. They may also negotiate various aspects of operations, such as peer relationships between resources, at the time of use of the resources. In other embodiments of the present invention, the wireless transceiver circuit 355 is configured to communicate with a wireless local area network (WLAN), such as an 802.11 series protocol compliant network. As used herein, an 802.11 series protocol compliant network includes 802.11a, 802.11b, 802.11g and any variations thereon that should be developed in the future.

The GPS receiver circuit 360, in cooperation with the processor 340, provides a processing circuit configured to process location signals, such as ranging signals, received from GPS satellites 42. The network transceiver 325 includes a transmitter 350 and a receiver 345. In some embodiments of the present invention, the transceiver 325 is configured to communicate with the wide area wireless communication network, in an associated format defined by a protocol of the network, to request and receive location assistance information. The local wireless transceiver circuit 355 is configured to communicate with a local wireless transmitter to request and receive location assistance information in the same format as defined for such information by the wide area wireless communication network. For example, the location assistance information may be provided based on a radio resource location services protocol (RRLP), such as that defined by the 3GPP TS 04.31 and 04.35 technical specifications issued by the 3GPP Organizational Partners.

As shown in FIG. 3, the mobile terminal 300 further includes a position computation circuit 335 that estimates a position of the mobile terminal 300 based on signals from satellite positioning system transmitters or GPS satellites 42 and location assistance information. The location assistance information is from an ad hoc protocol wireless transmitter in some embodiments of the present invention. In other embodiments, the location assistance information may be provided in the same format from either the wide area cellular network or from a local wireless transmitter. The position computation circuit in combination with the GPS receiver circuit 360, the local wireless transceiver circuit 355 and, in some embodiments, the network transceiver 325, define a position determination circuit suitable for use in the mobile terminal 300.

While, for example, the position computation circuit 335, and the processor 340 are shown as distinct blocks in the illustration of FIG. 3, it is to be understood that the functionality of these blocks may be combined into a single processor or spread across a plurality of different processors and/or other hardware configured to operate in the manner described herein. Furthermore, while the position computation circuit 335 and the GPS receiver circuit 360 are shown as distinct blocks in the illustration of FIG. 3, it is to be understood that aspects of the functionality of these blocks may be spread across different processors or circuitry and that the GPS receiver circuit 360 may also, in part, provide the position computation circuit of the present invention. For example, the location assistance information in some embodiments of the present invention is used to assist with acquisition of the location signals received from the GPS satellites 42. The GPS receiver circuit 360 may be configured to include the circuitry for both receiving and acquiring the location signals so as to provide, in combination with the position computation circuit 335, a position computation circuit that determines a position of a mobile terminal based on signals from the GPS satellites 42 and the location assistance information.

Although the position determination circuit of the present invention may be embodied in communication devices or systems, such as the mobile terminal 300, the present invention is not limited to such devices and/or systems. Instead, the present invention may be embodied in any method, transmitter, communication device, communication system, or computer program product that is configured to receive (or transmit) signals suitable for receiving location signals, such as those used for ranging measurements, from satellite positioning system transmitters and location assistance information as described with reference to various embodiments of the present invention herein.

Figure 4:
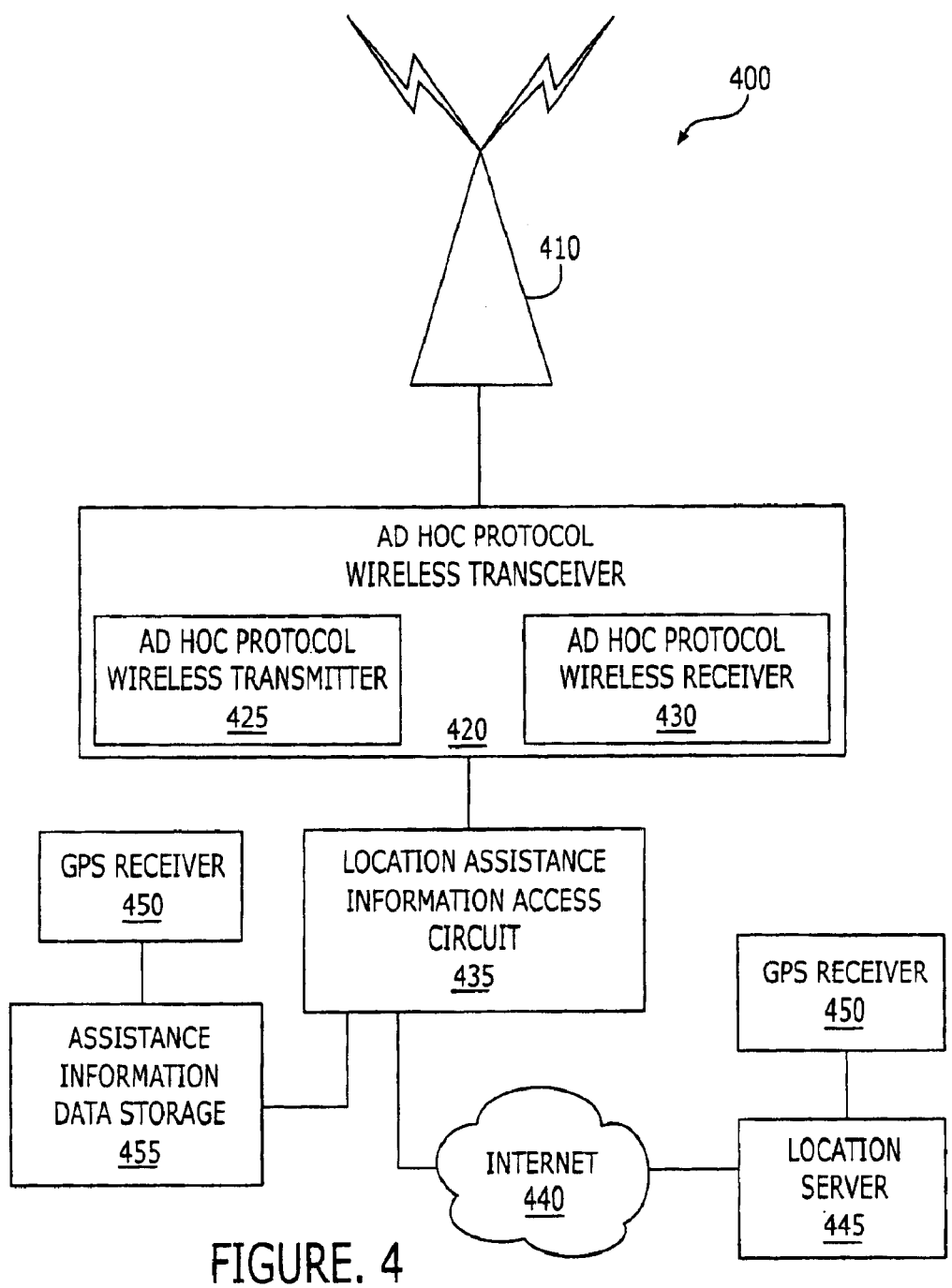
FIG. 4 is a schematic block diagram illustrating a location assistance information provider apparatus according to some embodiments of the present invention.

A location assistance information provider apparatus 400 according to some embodiments of the present invention will now be described with reference to the schematic block diagram illustration of FIG. 4. As shown in FIG. 4, a location assistance information provider apparatus 400 includes an ad hoc protocol wireless transceiver 420 coupled to an antenna 410. The ad hoc protocol wireless transceiver 420 includes an ad hoc protocol wireless receiver 430 configured to receive service discovery requests from mobile terminals that request location assistance information. The transceiver 420 further includes an ad hoc protocol wireless transmitter 425 configured to transmit a response to a received discovery request indicating the availability of the requested location assistance information and to transmit the location assistance information to the requesting mobile terminal.

The transceiver 420 is operatively coupled to a location assistance information access circuit 435 that is configured to obtain the location assistance information responsive to a received discovery request and to provide the obtained location assistance information to the ad hoc protocol wireless transceiver 420 for transmission using the antenna 410. In some embodiments of the present invention, the location assistance information access circuit 435 is operatively coupled to a remote location server 445, for example over the Internet 440. The location server 445 may be associated with a reference GPS receiver 450 that may be used by the location server 445 to generate location assistance information. In such embodiments, the location assistance information access circuit 435 may obtain some or all of the requested location assistance information from the location server 445.

In other embodiments of the present invention, the location assistance information access circuit 435 is coupled to a local assistance information data storage 455 to obtain the location assistance information. The assistance information data storage 455 may be coupled to a local reference GPS receiver 460 that may be used to generate the location assistance information. Thus, the location assistance information may be locally available at the location assistance information provider apparatus 400 or may be remotely located and accessible over a network, such as the Internet 440. It is also to be understood that embodiments of the present invention may have access to both local and remotely accessed sources of such information, which may used separately or in combination to generate the requested location assistance information.

Figure 5:
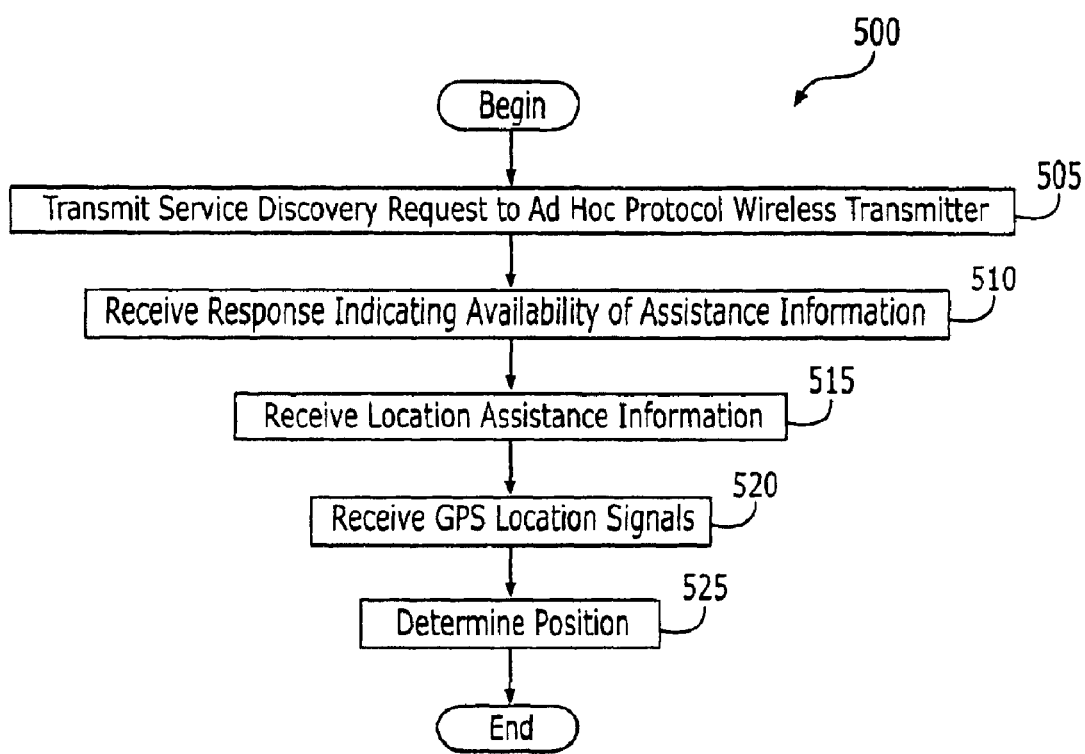
FIG. 5 is a flow chart illustrating operations for determining the position of a mobile terminal according to some embodiments of the present invention.
Figure 6:
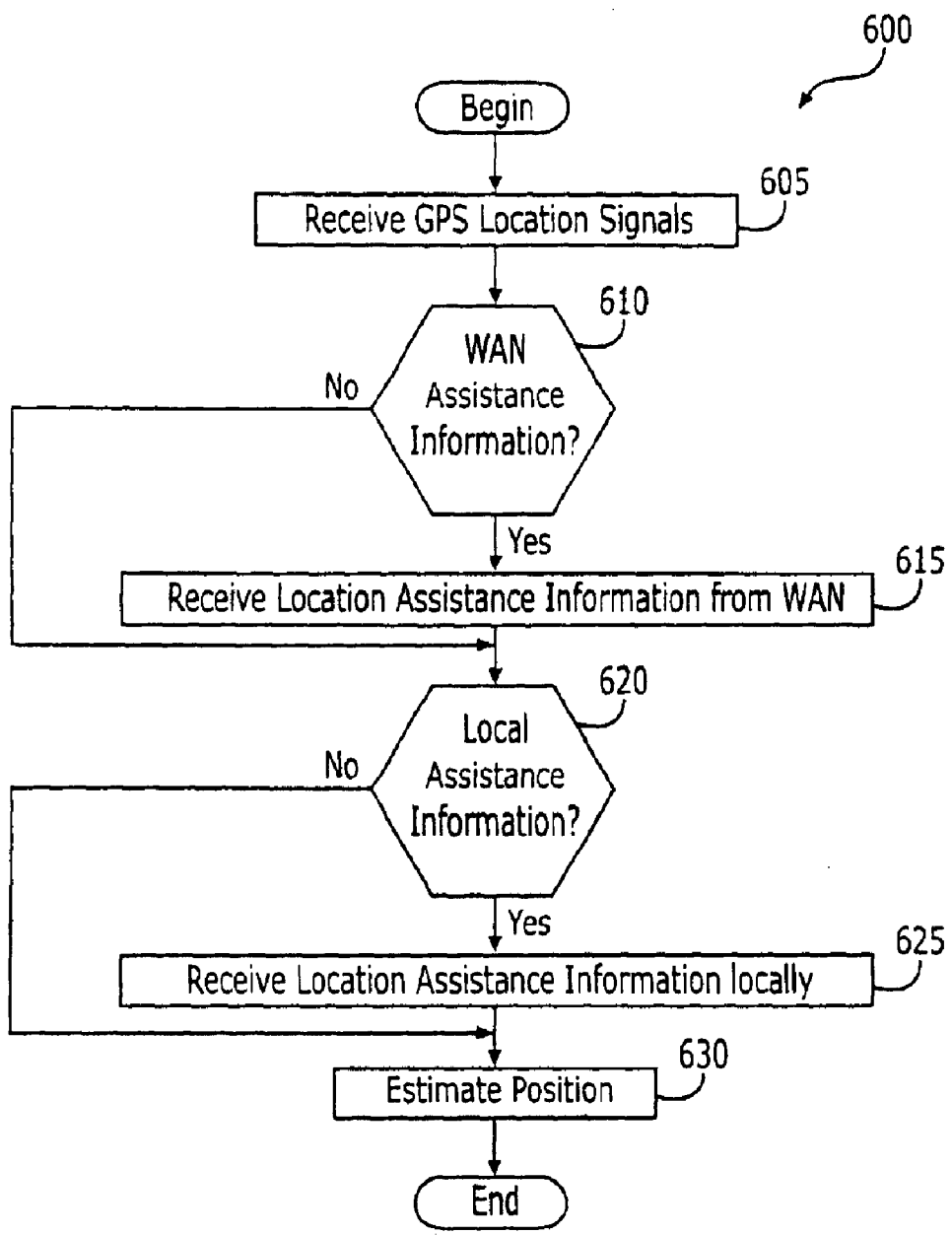
FIG. 6 is a flow chart illustrating operations for determining the position of a mobile terminal according to further embodiments of the present invention.

FIGS. 5 and 6 are flowchart illustrations of operations that may be carried out by a position determination circuit of a mobile terminal 300 according to some embodiments of the present invention. Operations related to determining the position of a mobile terminal according to embodiments of the present invention will now be described with reference to the flow chart diagram of FIG. 5. As shown in FIG. 5, operations 500 for determining the position of the mobile terminal based on signals received at the mobile terminal from satellite positioning system transmitters and location assistance information received at the mobile terminal from an ad hoc protocol wireless transmitter begin at Block 505 when the mobile terminal transmits a mobile service discovery request configured for receipt by an ad hoc protocol wireless transmitter. A response is received to the service discovery request from the ad hoc protocol wireless transmitter indicating the availability to the requesting mobile terminal of the requested location assistance information from the ad hoc protocol wireless transmitter (Block 510). If the information requested is available for the requesting mobile terminal, the location assistance information is received from the ad hoc protocol wireless transmitter (Block 515).

The mobile terminal further receives location signals, such as ranging signals from satellite positioning system transmitters, such as GPS satellite signals (Block 520). The position of the mobile terminal is determined by computing the location based on signals received from the GPS satellites and the received location assistance information (Block 525). The received location assistance information, in various embodiments of the present invention, includes an identification of locally visible satellites, i.e., satellites that are not only above the horizon for a particular location based on current position (traditional visible satellite information) but those from which the transmitter providing the assistance information has received signals. Thus, given the proximity between the ad hoc protocol transmitter and the mobile terminal, local hills, buildings, etc. affecting signal reception may be accounted for where the ad hoc protocol transmitter has a co-located associated GPS receiver to identify such "locally" visible satellites. Further efficiencies may be provided in some embodiments of the present invention by only providing other assistance information, such as ephemeris data, associated with the identified locally visible satellites.

Reference location information from the ad hoc protocol wireless transmitter may also be more accurate than would otherwise be available. For example, a GSM network typically can provide reference information no better than the location of the currently serving base station. The mobile terminal could be miles from this base station. Further network based location methods, such as timing advance methods, are still generally limited to several hundred meters on average. For a Bluetooth transmitter, a reference location of the transmitter would generally be less than one hundred meters from the mobile terminal and often within ten meters.

Operations 600 for determining the position of a mobile terminal according to further embodiments of the present invention will now be described with reference to the flow chart illustration of FIG. 6. As shown in FIG. 6, operations begin at Block 605 when the mobile terminal receives location signals, such as ranging signals from satellite positioning systems transmitters, such as GPS satellites. If assistance information from a wide area wireless communication network is desired (Block 610), location assistance information from the wide area wireless communication network is received in an associated format defined by a protocol of the wide area wireless communication network (Block 615). For example, in various embodiments of the present invention, such information will be obtained from the wide area wireless communication network when the user of the mobile terminal is in a location where home network access is available that entitles the user to receive the requested information from the wide area cellular network. However, such data may not be available, for example, if the provider of the wide area cellular network does not offer such data. Similarly, the user may not have a subscription or right allowing access to such data from the wide area cellular network or may be traveling and in a roaming mode where such information, even when available from the user's home network is not available from the roaming network.

If it is not desired to obtain the assistance information from the wide area wireless communication network (Block 610), operations move to Block 620. If it is desired to obtain location assistance information locally (Block 620), the location assistance information is received from a local wireless transmitter in the format defined by a protocol of the wide area wireless communication network for such assistance information (Block 625). It is to be understood that the local wireless transmitter and the wide area wireless communication network are uncoordinated and have different associated wireless transmissions protocols. For example, the local wireless transmitter may be an ad hoc protocol wireless transmitter. Alternatively, the local wireless transmitter may be a wireless local area network (WLAN).

Various embodiments of obtaining such assistance information from an ad hoc protocol wireless transmitter were described with reference to FIG. 4 above. In some embodiments of the present invention using assistance information from a wireless local area network, the assistance information is obtained from a location server (such as the location server 445) over the wireless local area network. The location server 445, as described with reference to FIG. 4, may have a satellite positioning system receiver, such as a GPS receiver 450, which may be used in generating the requested location assistance information. In further embodiments of the present invention using a wireless local area network, obtaining the location assistance information includes providing the universal resource location (URL) of the location server 450 from the mobile terminal to the wireless local area network.

As shown at Block 630, the position of the mobile terminal is estimated based on the received signal from the satellite positioning system transmitters. Location assistance information received from either the wide area wireless communication or the local wireless transmitter is used in generating an estimate of the position of the mobile terminal. For example, the assistance information may be use to facilitate acquisition of the location signals from the satellites. Accordingly, as used herein, estimating, determining or computing the position of a mobile terminal based on received signals from the satellite positioning system transmitters and location assistance information provided from a local wireless transmitter includes using the obtained location assistance information to facilitate acquisition of the received signals from the satellite positioning system transmitters. In other embodiments of the present invention, the location assistance information may include information that may be used, for example, to increase the accuracy of the position computation based on a received signal from a satellite positioning system transmitter.

Figure 7:
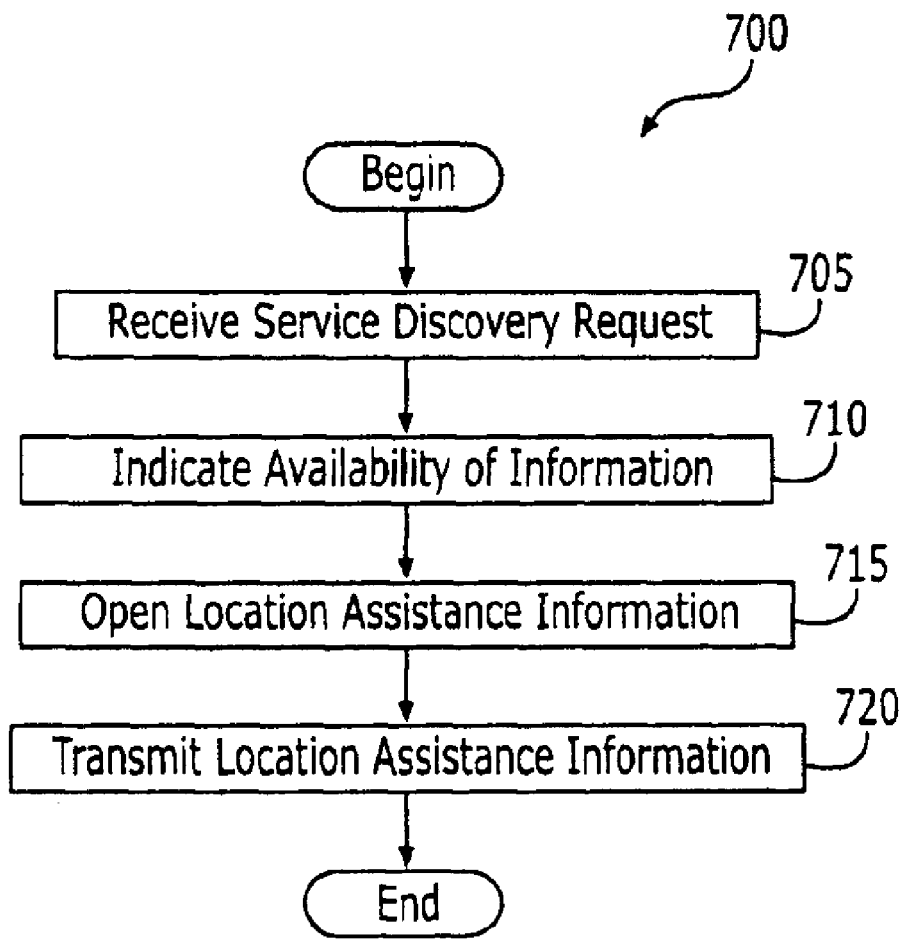
FIG. 7 is a flow chart illustrating operations for providing location assistance information to a mobile terminal according to some embodiments of the present invention.

Operations 700 for providing location assistance information to a mobile terminal for some embodiments of the present invention will now be described with reference to FIG. 7. In particular, operations with reference to FIG. 7 will be described for embodiments of the present invention in which the local wireless transmitter is an ad hoc protocol wireless transmitter. Operations begin at Block 705 when the ad hoc protocol wireless transmitter receives from the mobile terminal a service discovery request configured for receipt by the ad hoc protocol wireless network transmitter, that requests location assistance information.

Operations at Block 705 allow the mobile terminal to discover what resources are available from the ad hoc protocol wireless transmitter and further allow the ad hoc protocol wireless transmitter to identify the mobile terminal making the request. Thus, the provider of the ad hoc protocol wireless transmitter may selectively provide requested location assistance information either at a cost or as a service to the user. In some embodiments of the present invention, the location assistance information may be provided by the access point owner (i.e., the owner of the local wireless transmitter), such as the owner of a shopping mall, an airport or the like, as a courtesy to customers allowing them to facilitate navigation on the premises. Similarly, in a tourist based city center, free access to such information to facilitate tourist travel to various sites may be provided by municipal authorities. For embodiments utilizing a wireless local area network, the provision of such assistance information may be integrated with the more general uses provided by presenting available wireless public networks in areas such as city centers to facilitate communications and productivity of visitors, such as businessmen or students.

A response to the service discovery request is sent to the mobile terminal by the ad hoc protocol wireless transmitter indicating availability of the location assistance information from the ad hoc protocol wireless network transmitter (Block 710). If such information is not available, the mobile terminal may be so notified. The ad hoc wireless transmitter obtains the location assistance information as described previously with reference to various embodiments shown in FIG. 4, such as from a location server 445 having a satellite positioning receiver 450 (Block 715). The obtained location assistance information is transmitted to the requesting mobile terminal (Block 720).

The flowcharts, flow diagrams and block diagrams of FIGS. 3 through 7 illustrate the architecture, functionality, and operation of possible implementations of systems, methods and computer program products for determining the position of a mobile terminal according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for determining the position of a mobile terminal comprising:

determining the position of the mobile terminal based on signals received at the mobile terminal from satellite positioning system transmitters and location assistance information received at the mobile terminal from an ad hoc protocol wireless transmitter.

2. The method of claim 1 wherein the ad hoc protocol wireless network transmitter comprises a Bluetooth protocol transmitter.

3. The method of claim 1 wherein the satellite positioning system transmitters comprise Global Positioning System (GPS) satellites.

4. The method of claim 1 wherein determining the position includes:

transmitting a service discovery request configured for receipt by the ad hoc protocol wireless network transmitter;

receiving a response to the service discovery request from the ad hoc protocol wireless network transmitter indicating availability of the location assistance information from the ad hoc protocol wireless network transmitter; and receiving the location assistance information from the ad hoc protocol wireless transmitter.

5. The method of claim 4 wherein the mobile terminal is configured to communicate with a wide area wireless communication network configured to provide wireless communication services based on an associated communication protocol that supports provision of location assistance information to the mobile terminal and wherein the method further comprises:

determining availability of the wireless communication network to the mobile terminal; and obtaining the location assistance information from the wireless communication network.

6. The method of claim 5 wherein location assistance information received from the ad hoc protocol wireless network and location assistance information received from the wireless communication network share a common format for use in determining the position of the mobile terminal.

7. The method of claim 6 wherein the wireless communication network comprises a Global System for Mobile communications (GSM) network and wherein the common format is based on a radio resource location services protocol (RRLP).

8. The mobile terminal of claim 5 wherein determining the position further comprises selecting the ad hoc protocol wireless transmitter or the wireless communication network to provide the location assistance information.

9. The method of claim 4 wherein the location assistance information includes an identification of locally visible satellites.

10. The method of claim 4 wherein determining the position further comprises the following performed by the ad hoc protocol wireless transmitter:
   receiving the service discovery request;
   obtaining the location assistance information; and
   transmitting the obtained location service information to the mobile terminal.

11. The method of claim 10 wherein obtaining the location assistance information comprises obtaining the location assistance information from a location server having a satellite positioning system receiver.

12. The method of claim 10 wherein the ad hoc protocol wireless transmitter includes a satellite positioning system receiver and wherein obtaining the location assistance information comprises obtaining the location assistance information from a storage device of the ad hoc protocol wireless transmitter based on signals received by the satellite positioning system receiver.

13. A method for providing location assistance information to a mobile terminal comprising the following performed by an ad hoc protocol wireless transmitter:
   receiving from the mobile terminal a service discovery request configured for receipt by the ad hoc protocol wireless transmitter to determine availability of location assistance information;
   transmitting a response to the service discovery request indicating availability of the location assistance information from the ad hoc protocol wireless network transmitter;
   obtaining the location assistance information from a satellite positioning system receiver; and
   transmitting the location assistance information to the mobile terminal.

14. The method of claim 13 wherein the ad hoc protocol wireless network transmitter comprises a Bluetooth protocol transmitter.

15. The method of claim 13 wherein obtaining the location assistance information from a satellite positioning system receiver further comprises obtaining the location assistance information from a location server having a satellite positioning system receiver.

16. The method of claim 13 wherein the ad hoc protocol wireless transmitter includes a satellite positioning system receiver and wherein obtaining the location assistance information from a satellite positioning system receiver further comprises obtaining the location assistance information from a storage device of the ad hoc protocol wireless transmitter based on signals received by the satellite positioning system receiver.

17. A method for determining the position of a mobile terminal comprising the following performed by the mobile terminal:
   receiving location signals from satellite positioning system transmitters;
   receiving location assistance information from a wide area wireless communication network in an associated format defined by a protocol of the network;
   receiving location assistance information from a local wireless transmitter in the associated format, wherein the local wireless transmitter and the wide area wireless communication network are uncoordinated and have different associated wireless transmission protocols; and
   determining the position of the mobile terminal based on the received location signals from the satellite positioning system transmitters and location assistance information received from either the wide area wireless communication network or the local wireless transmitter.

18. The method of claim 17 wherein the local wireless transmitter comprises an ad hoc protocol wireless transmitter.

19. The method of claim 18 wherein the ad hoc protocol wireless network transmitter comprises a Bluetooth protocol transmitter.

20. The method of claim 18 further comprising the following performed by the ad hoc protocol wireless transmitter:
   obtaining the location assistance information from a location server having a satellite positioning system receiver.

21. The method of claim 18 wherein the ad hoc protocol wireless transmitter includes a satellite positioning system receiver and wherein the method further comprises the following performed by the ad hoc protocol wireless transmitter:
   obtaining the location assistance information from a storage device of the ad hoc protocol wireless transmitter based on signals received by the satellite positioning system receiver.

22. The method of claim 17 wherein the local wireless transmitter comprises a wireless local area network.

23. The method of claim 22 wherein receiving location assistance information from a local wireless transmitter further comprises obtaining the location assistance information over the wireless local area network from a location server having a satellite positioning system receiver.

24. The method of claim 23 wherein obtaining the location assistance information over the wireless local area network from a location server having a satellite positioning system receiver includes providing a universal resource locator (URL) of the location server from the mobile terminal to the wireless local area network.

25. The method of claim 23 wherein the wireless local area network comprises an 802.11 series protocol network.

26. A position determination circuit for a mobile terminal comprising:
   a satellite positioning system signal processing circuit configured to process location signals from satellite positioning system transmitters;
   a wireless transceiver configured to communicate with an ad hoc protocol wireless transmitter to request and receive location assistance information; and
   a position computation circuit configured to determine a position of the mobile terminal based on signals from the satellite positioning system signal processing circuit and the location assistance information from the ad hoc protocol wireless transmitter provided by the wireless transceiver.

27. The position determination circuit of claim 26 wherein the wireless transceiver is further configured to transmit a service discovery request to the ad hoc protocol wireless transmitter to determine if location assistance information is available from the ad hoc protocol wireless transmitter.

28. The position determination circuit of claim 27 wherein the ad hoc protocol wireless network transmitter comprises a Bluetooth protocol transmitter.

29. A mobile terminal including the position determination circuit of claim 26.

30. A position determination circuit for a mobile terminal comprising:

a satellite positioning system signal processing circuit configured to process location signals from satellite positioning system transmitters;

a wireless transceiver configured to communicate with a wide area wireless communication network in an associated format defined by a protocol of the network to request and receive location assistance information;

a wireless transceiver configured to communicate with a local wireless transmitter in the associated format to request and receive location assistance information, wherein the local wireless transmitter and the wide area wireless communication network are uncoordinated and have different associated wireless transmission protocols; and a position computation circuit configured to determine the position of the mobile terminal based on the location signals from the satellite positioning system transmitters and location assistance information received from either the wide area wireless communication network or the local wireless transmitter.

31. The position determination circuit of claim 30 wherein the local wireless transmitter comprises an ad hoc protocol wireless transmitter.

32. The position determination circuit of claim 30 wherein the local wireless transmitter comprises a wireless local area network.

33. A mobile terminal including the position determination circuit of claim 30.

34. A location assistance information provider apparatus comprising:

an ad hoc protocol wireless receiver configured to receive service discovery requests from mobile terminals to determine availability of location assistance information;

an ad hoc protocol wireless transmitter configured to transmit a response to a received service discovery request indicating availability of the location assistance information from the location assistance information provider and to transmit location assistance information to requesting mobile terminals;

a location assistance information access circuit configured to obtain the location assistance information and provide obtained location assistance information to the ad hoc protocol wireless transmitter; and a satellite positioning system receiver.

35. The apparatus of claim 34 wherein the ad hoc protocol comprises Bluetooth.

* * * * *